United States Patent [19]

Nagamoto et al.

[11] 4,276,468
[45] Jun. 30, 1981

[54] ELECTRIC HOME APPLIANCES

[75] Inventors: Shun'ichi Nagamoto, Nara; Kazuho Sakamoto, Kyoto, both of Japan

[73] Assignee: Matsushita Electric Industrial Co., Ltd., Osaka, Japan

[21] Appl. No.: 926,505

[22] Filed: Jul. 20, 1978

[30] Foreign Application Priority Data

Jul. 27, 1977 [JP] Japan .................................. 52/90719

[51] Int. Cl.$^3$ ............................................. G06M 3/02
[52] U.S. Cl. ........................... 235/92 CT; 235/92 MT; 235/92 TF; 235/92 CA; 235/92 DE
[58] Field of Search ........ 235/92 CA, 92 TF, 92 CV, 235/92 MT, 92 ST, 92 DE, 92 CT; 73/362 AR, 362 R, 336.5; 219/491, 489, 490

[56] References Cited

U.S. PATENT DOCUMENTS

| 3,790,910 | 2/1974 | McCormack | 235/92 MT |
| 3,979,056 | 9/1976 | Barnes | 235/92 CT |
| 3,988,577 | 10/1976 | Leitner | 235/92 MT |
| 3,996,451 | 12/1976 | Harrington et al. | 235/92 ST |
| 4,027,143 | 5/1977 | Witriol et al. | 235/92 MT |
| 4,047,001 | 9/1977 | Witriol et al. | 235/92 TF |

Primary Examiner—Joseph M. Thesz
Attorney, Agent, or Firm—Joseph W. Farley

[57] ABSTRACT

An electric home appliance which is automatically controllable with use of a sensor such as temperature sensor or humidity sensor. Variations in terms of analogue quantities given by the sensor are converted to variations in the number of pulses by an oscillator connected to the sensor and comprising an astable multivibrator or the like. The number of pulses is counted by a counter, the gating time of which is determined for example by divided frequency of a commercial power supply. The control system is inexpensive to make and has high reliability.

9 Claims, 14 Drawing Figures

ELECTRIC HOME APPLIANCES

This invention relates to electric home appliances, such as electronic ovens, air conditioners, refrigerators, light-adjustable illuminating devices, washing machines, etc., which are operated with a commercial power supply and which have sensor means for detecting variations as of temperature, humidity, brightness, concentration or speed to control the appliance.

Generally electric home appliances having a so-called electronic brain include those controllable based on analogue-to-digital conversion and those controllable directly in accordance with analogue quantities. The appliances of the former type have the advantage that the use of an analogue-digital converter permits very accurate control in complex manner based on an increased amount of information but possess the drawback of being too costly to make for commercial acceptance. Although the latter can be made inexpensively, they still remain to be improved in accuracy, amenability to complex control and stability against noise.

The present invention contemplates provision of electric home appliances which incorporate digital control means, are inexpensive to make despite the use of the control means, operate with high accuracy and are adapted for complex control.

An object of this invention is to provide electric home appliances including control means in which analogue variations in the impedance value of sensor means in accordance with variations in temperature, humidity or the like are digitally converted to variations in the number of pulses to process the data.

Another object of this invention is to convert the analogue variations given by the sensor means to variations in the number of pulses by an astable multivibrator connected to the sensor means.

Another object of this invention is to convert the analogue variations given by the sensor means to variations in the number of pulses and to count up the resulting pulse numbers by separately provided counter means.

Another object of this invention is to provide the gating time of the counter means by the frequency division of a commercial power supply frequency.

Another object of this invention is to provide electric home appliances including control means in which a plurality of impedance elements are provided independently of the electric impedance of sensor means for defining the oscillation time constant of an oscillator, the impedance elements being selectively connectable to the oscillator by change-over switch means to alter the oscillation mode of the oscillator and to thereby give a wider operating range to the control means.

Still another object of this invention is to provide electric home appliances having control means in which a plurality of sensor means for defining the oscillation time constant of an oscillator are selectively connectable to the oscillator by change-over switch means so that the data from the sensor can be subjected to time division for processing.

Other features and advantages of the present invention will become more apparent from the following description of embodiments given with reference to the accompanying drawings, in which.

Figure 1:
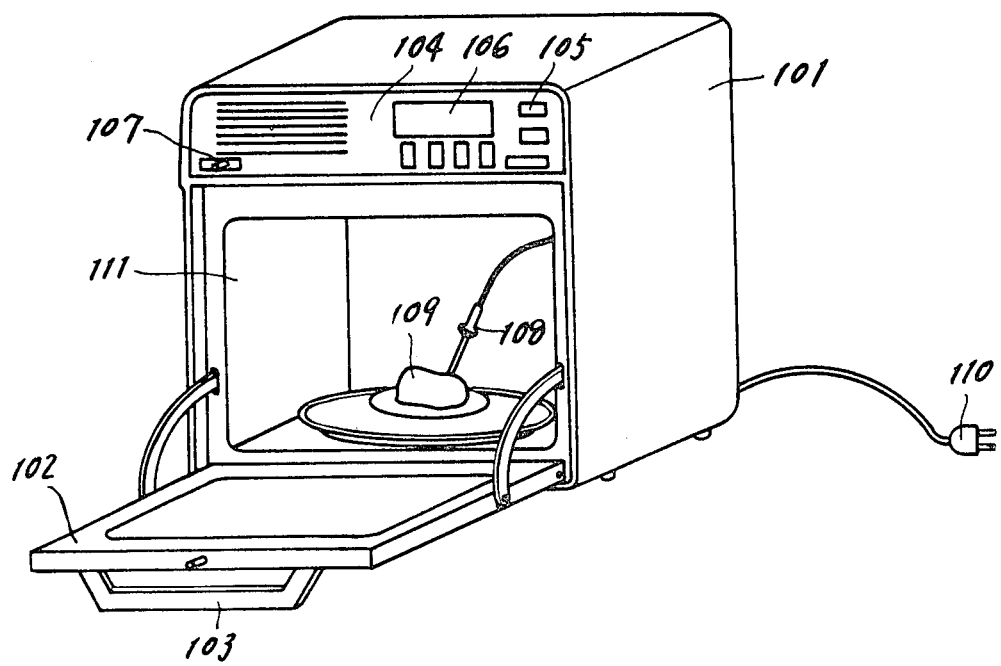
FIG. 1 is a perspective view showing the front of an electronic oven embodying this invention.

FIG. 1 is a perspective view showing the front of an electronic oven, an example of electric home appliances. The oven includes a main body 101, a closable front door 102 and a handle 103 on the door. An operating unit 104 comprises setting keys 105, an indicator 106, a power supply switch 107, etc. A temperature sensor probe 108 is adapted to be inserted into food 109 to detect the temperature of the food 109. Indicated at 110 is a plug for connection to a commercial power supply, and at 111 the interior of the oven.

Figure 2:
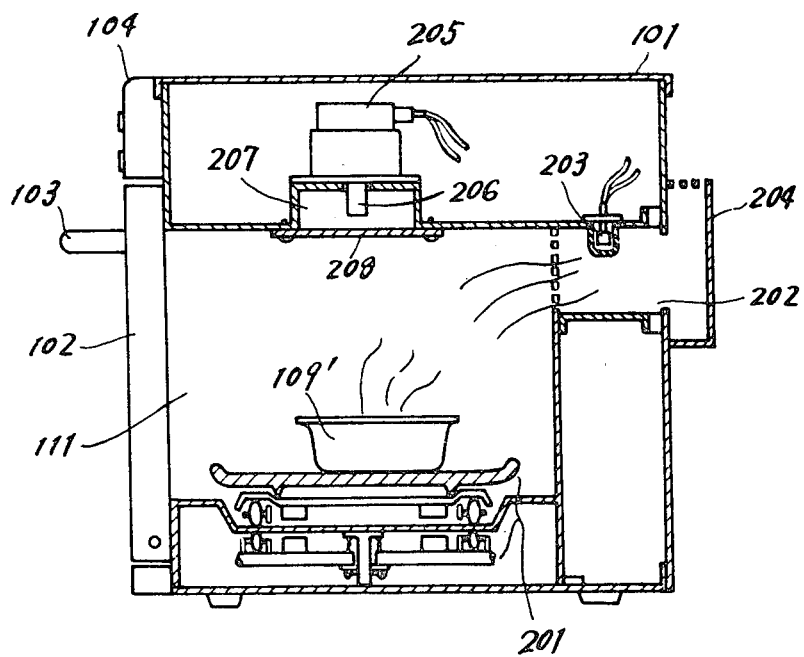
FIG. 2 is a view in section showing another electronic oven embodying the invention.

FIG. 2 is a sectional view showing another electronic oven embodying this invention. The temperature sensor probe of the embodiment of FIG. 1, although adapted to detect temperature with very high accuracy, must have its base end connected to and supported by the oven wall and is therefore unsuited for use in electronic ovens in which turntable means 201 rotates to move the food during cooking as seen in FIG. 2 since the probe 108 will then be twisted. The oven of FIG. 2 is accordingly provided with a humidity sensor 203 in a vent portion 202. The sensor 203 is useful for controlling the cooking operation by sensing the vapor released from food 109'. FIG. 2 shows a cover 204 for the vent portion, a magnetron 205, an antenna 206 for the magnetron, a recess 207 formed in the oven wall for protecting the antenna 206 and a protective cover 208 made of material involving low dielectric loss.

Figure 3:
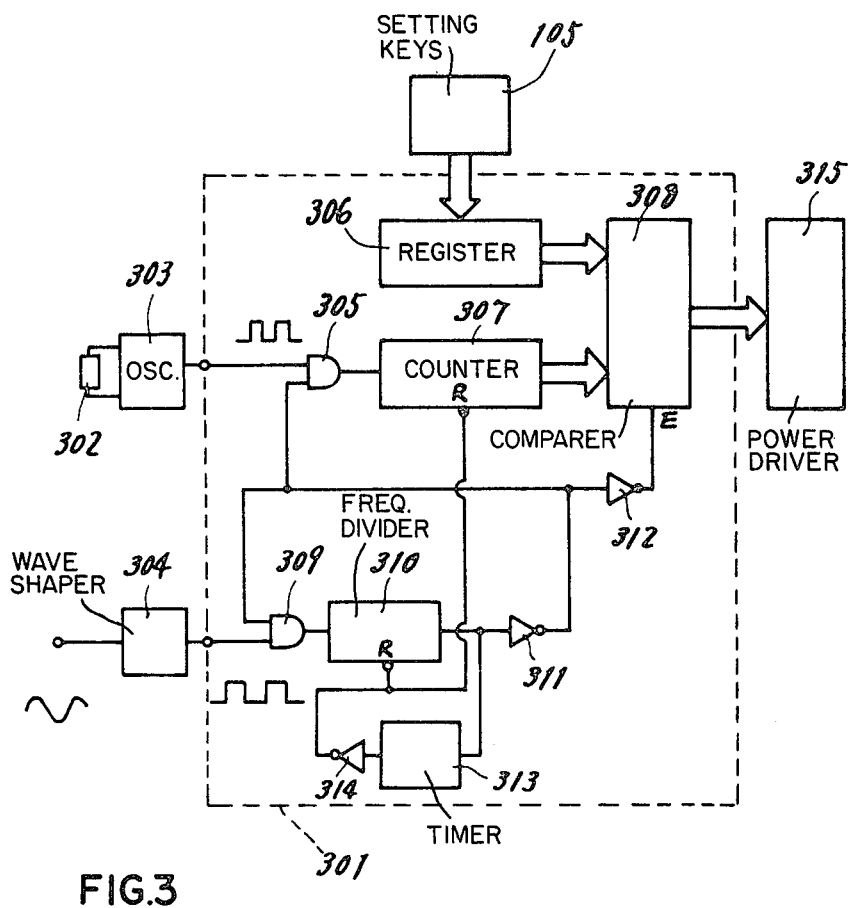
FIG. 3 is a block diagram showing the construction of control means of this invention.
Figure 5:
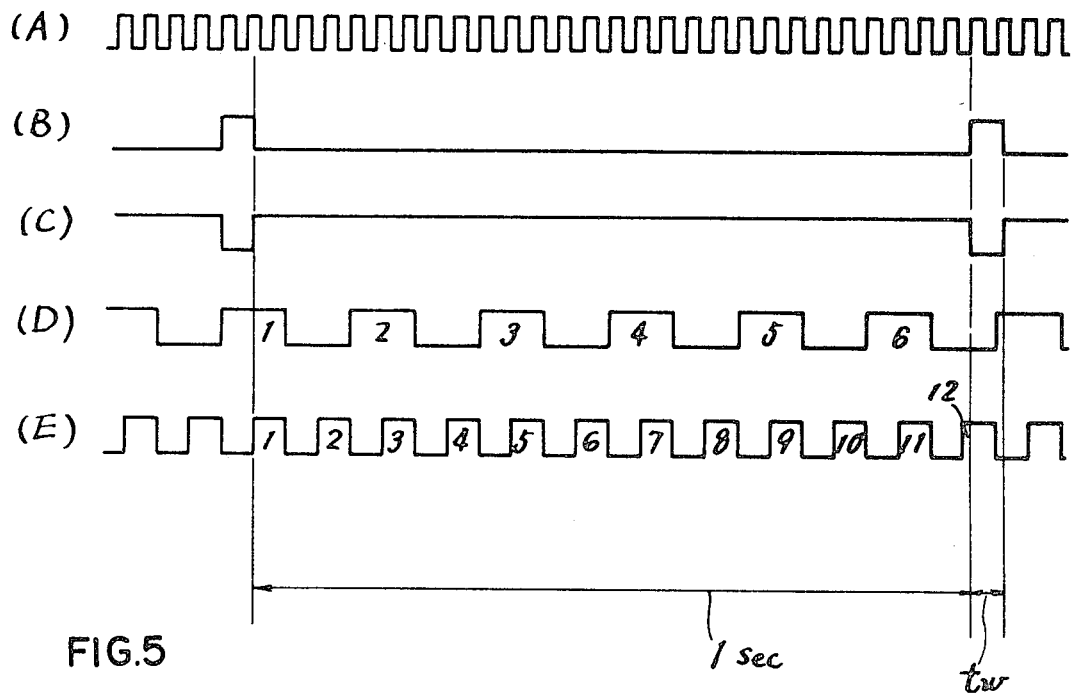
FIG. 5 is a time chart of FIG. 3.

A system will be described below for controlling such electronic ovens in accordance with the data given by the sensor means. With reference to FIG. 3, sensor means 302, which may typically be the temperature sensor probe 108 or humidity sensor 203 described, is connected to an oscillator 303 comprising an astable multivibrator or the like. The impedance value of the sensor means 302 may function to directly define the oscillation time constant of the oscillator 303 or may be converted to voltage or current first and then fed to the oscillator 303. A wave form shaping circuit 304 converts the sine waves of an a.c. power supply to rectangular waves of the same frequency. A control circuit 301, which can be efficiently economically constructed from LSI parts useful for microcomputers, is schematically shown as a circuit equivalent thereto. A power drive circuit 315 comprising a bidirectional three-terminal control rectifying element, power relay or the like functions in response to a signal from the control circuit 301. The output of the oscillator 303 is passed through an AND gate 305 of the control circuit 301 and fed to a counter 307, which counts the output pulses from the oscillator 303. The gating time for the counter is determined by an output obtained by the frequency division of the power supply frequency or of a time base specifically given by an astable multivibrator or the like, such that the AND gate 305 is opened for example for one second. When the power supply frequency is used as illustrated, sine waves of the power supply frequency are fed to the wave form shaping circuit 304 which delivers rectangular pulses (A) as shown in FIG. 5. The pulses are fed through an AND gate 309 to a frequency divider 310, by which the power supply frequency is divided to signals of duration for example of one second. Upon lapse of one second, the divider 310 gives a signal (B) of H level shown in FIG. 5 to an inverter 311, which in turn applies a signal (C) of L level shown in FIG. 5 to the AND gates 305 and 309. Consequently the gates 305 and 309 are closed, whereby the pulse signal from the oscillator 303 corresponding to the impedance value of the sensor means and the power supply frequency pulse signal from the shaping circuit 304 are prevented from flowing into the counter 307 and frequency divider 310. The section tw shown in FIG. 5 is provided by a timing circuit 313 including a monostable multivibrator and an inverter 314. The counter 307 and frequency divider 310 are reset to the initial state upon lapse of the section tw after the signal of one-second duration has been emitted from the divider 310. A register 306 stores binary data corresponding to the cooking finishing temperature of finished state of the food preset by the user with the key 105, while the counter 307 stores the number of pulses counted for one second in corresponding relation to the impedance value of the sensor means. Since H-level signal is fed through an inverter 312 to the enabling terminal E of a comparison-arithmetic circuit 308, the circuit 308 which compares the data in the counter 307 with the data in the register 306 gives a signal to the power drive circuit 315 when the operation revealed the specified result, turning off the bidirectional three-terminal control rectifying element or power relay to control the magnetron 205.

Figure 6A:
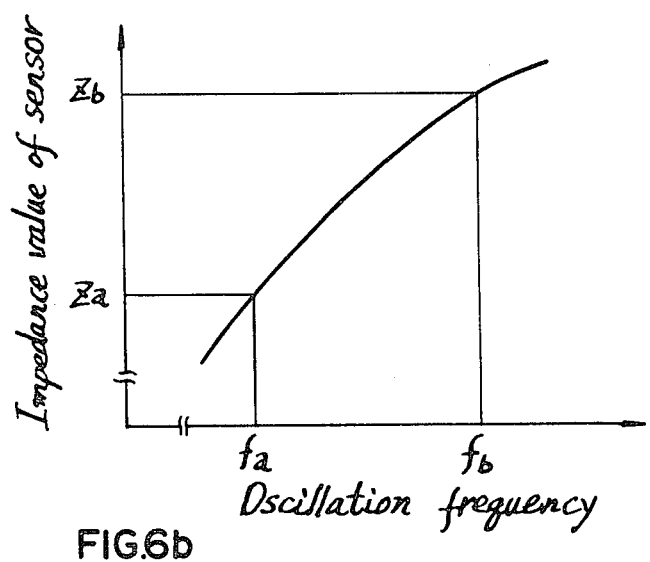
FIGS. 6a and 6b are diagrams each showing the characteristics of an oscillation circuit.
Figure 6B:
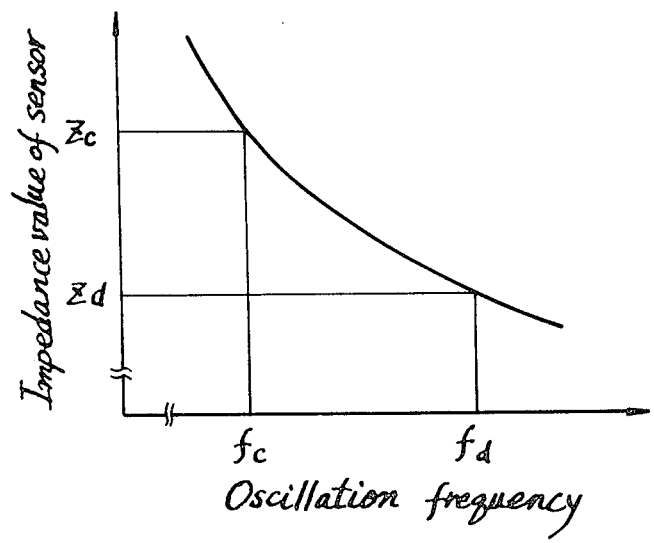

The oscillation frequency of the oscillator 303 may vary with variations in the impedance value of the sensor means 302 in a monotonously increasing fashion as illustrated in FIG. 6a or in a monotonously decreasing fashion as seen in FIG. 6b. In the case of monotonous increase, the oscillation frequency of the oscillator 303 varies from fa to fb as the impedance value of the sensor means varies from Za to Zb. For example, as indicated at (D) and (E) in FIG. 5, the counter 307 receives 6 pulses for one second when the impedance value of the sensor means is Za and the oscillation frequency is fa, and 12 pulses for one second when the impedance value is Zb and the oscillation frequency is fb, thus clarifying the operating point of the sensor means 302.

Figure 8A:
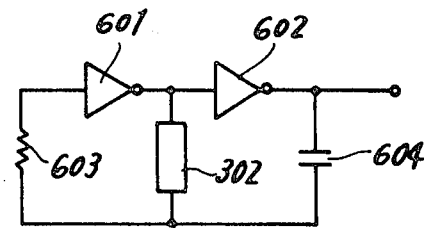
FIGS. 8a to 8d are circuit diagrams showing various examples of oscillation circuits.
Figure 8B:
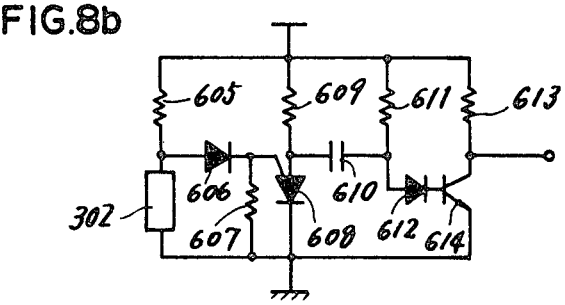
Figure 8C:
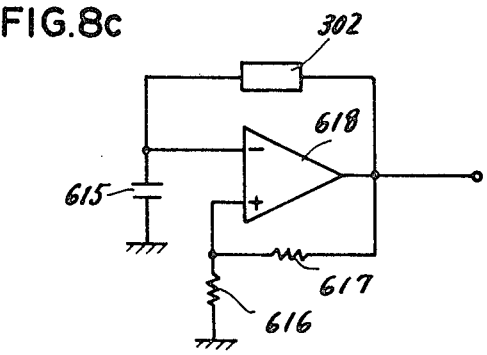
Figure 8D:
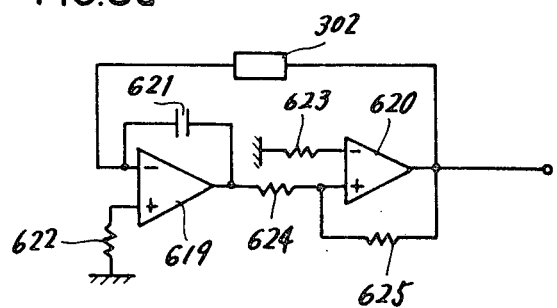

FIGS. 8a to 8d are specific examples of circuits for the oscillator 303, each of which is an astable multivibrator utilizing variations in the impedance value of the sensor means 302. Indicated at 601 and 602 in FIG. 8a are inverters comprising C MOS IC, at 603 is a resistor and at 604 a capacitor. The circuit of FIG. 8b comprises resistors 605, 607, 609, 611, 613, a capacitor 610, diodes 606, 612, a PUT (programmable unijunction transistor) 608 and an NPN transistor 614. FIG. 8c shows a circuit comprising a capacitor 615, resistors 616, 617 and an arithmetic amplifier 618. FIG. 8d shows a circuit comprising arithmetic amplifiers 619, 620, a capacitor 621 and resistors 622 to 625. Especially the circuits shown in FIGS. 8a, 8c and 8d are operable over a wide range since the product of the impedance of the sensor means 302 and that of the capacitor 604, 615 or 521 is in proportion to the oscillation time constant, with the result that the oscillation frequency varies linearly when the operating resistivity of the sensor means 302 alters even over a wide range. For example, although the operating resistivity of the humidity sensor 203 of the embodiment shown in FIG. 2 varies over a wide range of $10^4$ to $10^8$ ohms, the data from the humidity sensor 203 can be processed with very satisfactory accuracy with use of such a circuit.

Figure 4A:
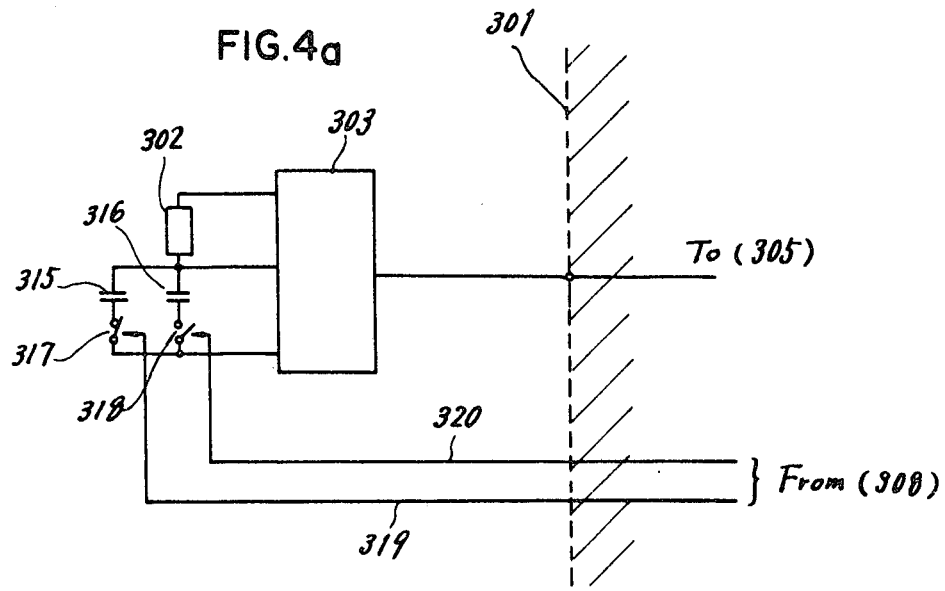
FIGS. 4a and 4b are circuit block diagrams showing principal parts of first and second modifications of this invention respectively.

When it is desired to cover the operation of the sensor means 302 over a still wider range, the control means shown in FIG. 4a is useful. The oscillation time constant of the oscillator 303 is determined by the sensor means 302 and a first capacitor 315 or second capacitor 316. The first and second capacitors 315 and 316 are alternatively connectable to the oscillator 303 by a first change-over switch 317 and a second change-over switch 318 respectively. Thus in response to a signal 319 or 320 from the comparison-arithmetic circuit 308 of the control circuit 301, either one of the capacitors determines the oscillation time constant, permitting the oscillator 303 to oscillate in the mode concerned, feeding a pulse output to the counter of the control circuit 301.

Figure 7:
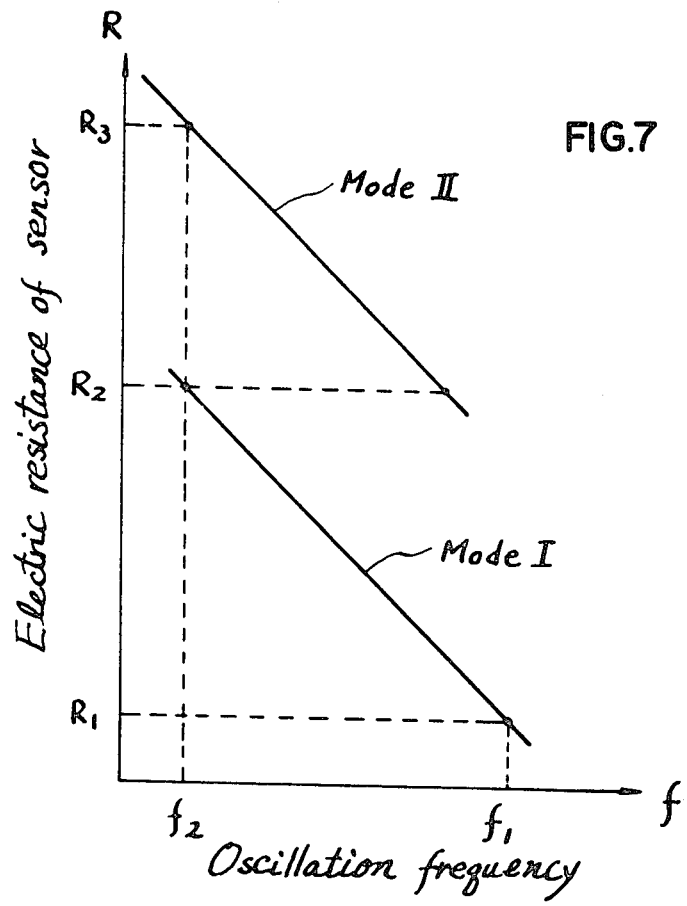
FIG. 7 is a diagram showing the characteristics of an oscillation circuit according to the first modification of the invention.

FIG. 7 in which the oscillation modes provided by the first and second capacitors 315 and 316 are referred to as "Mode I" and "Mode II" respectively shows the relation between variations in the electric resistance of the sensor means 302 and the oscillation frequencies of the oscillator 303. It is now assumed that the highest frequency of the oscillator 303 which can be processed by the counter of the control circuit 301 is $f_1$, and that the oscillation frequency required for detecting the state of the sensor means 302 with high accuracy is $f_2$. When the operation of the sensor means 302 is to be detected only in one mode, for example in Mode I, the detection is possible only in the resistance range of $R_1$ to $R_2$, whereas the use of both Mode I and Mode II provides a wider range of $R_1$ to $R_3$ for detecting the operation of the sensor means 302.

Figure 4B:
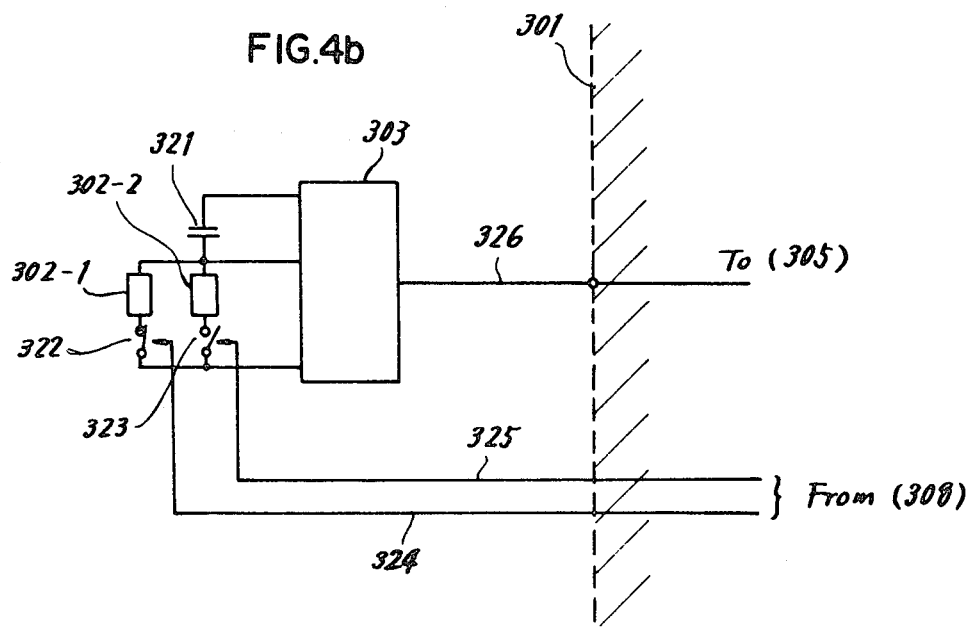
Figure 9:
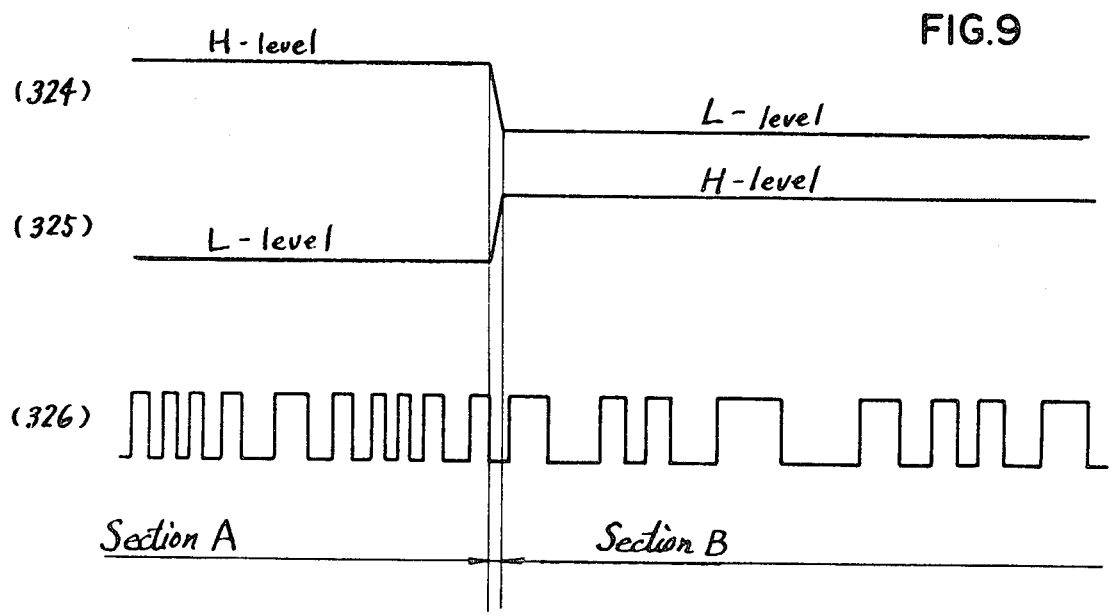
FIG. 9 is a timing diagram of some signals used in the second modification of this invention.

Further with reference to FIGS. 4b and 9, a control system will be described below which has a plurality of sensor means and which is adapted to inexpensively process the data from the plurality of sensor means. The oscillation time constant of the oscillator 303 is determined by the capacitor 321 and first sensor means 302-1 or second sensor means 302-2. The first and second sensor means 302-1 and 302-2 are alternatively connectable to the oscillator 303 by first and second change-over switch means 322 and 323 respectively. The switch means 322 and 323 are adapted to be alternatively actuated in response to signals 324 and 325 respectively from the comparison-arithmetic circuit 308 within the control circuit 301. As illustrated in FIG. 9, for example, pulse signals are available in a time-divided fashion such that the output signal 326 of the oscillator 303 contains data from the first sensor means 302-1 as indicated in section A when the signal 324 is at H level and the signal 325 is L level, whereas the output signal 326 of the oscillator 303 contains data from the second sensor means 302-2 as indicated in section B when the signal 324 is at L level and the signal 325 at H level. The two pieces of data from the two sensor means 302-1 and 302-2, when discriminated within the control circuit 301, can be processed reliably at a low cost.

Briefly, the present invention embodied as above have the following features:

(1) The appliance is controllable accurately strictly in accordance with the data from sensor means since the data is converted by an oscillator into a pulse signal having a continuously variable frequency and then fed to a control circuit.

(2) Since the gating time is provided by the power supply frequency for the counter, the base time is available with relatively high accuracy by inexpensive means.

(3) The control means is widely usable with different sensor means if the oscillator and other components are suitably replaced.

(4) With the present invention, the input pulse signals given during a specified period of time, for example one second, are counted, and the count is used as the data from the sensor means 302. Thus the count indicates the average value during one second of the resistivities of operating points of the sensor means 302. Similarly the count involves the average of magnitudes of noise during one second. This provides an improved S/N ratio with the influence of noise suppressed. If the control circuit 301 is adapted to have such a function that when the pulse number counted every second exceeds a predetermined value e.g. three times consecutively, the data concerned is interpreted as true data, the circuit will then be serviceable more reliably free of the influence of noise.

(5) A circuit can be provided which comprises a plurality of impedance elements in addition to the electric impedance of sensor means to define the oscillation time constant of an oscillator, one of the impedance elements being selectively connectable to the oscillator by change-over switch means to alter the oscillation mode of the oscillator. This circuit provides a control system which is very inexpensive and operable over a wide operating range or with high accuracy.

(6) The invention further provides a control system comprising a plurality of sensor means for defining the oscillation time constant of an oscillator, one of the sensor means being selectively connectable to the oscillator by change-over switch means so that the data from the sensor means can be subjected to time division for processing, whereby the appliance can be controlled inexpensively but efficiently with use of the plurality of sensor means.

Thus this invention provides electric home appliances which incorporate an electronic brain and is yet inexpensive to make and convenient to use.

What is claimed is:

1. An electric home appliance incorporating a control system comprising sensor means having an impedance value variable with variations in temperature, humidity or other state; a control circuit connected to the sensor means and including oscillator means, counter means for counting the number of oscillating output pulses from the oscillator means, and means for determining gating time for the counter means; characterized in that the oscillator means has an oscillation frequency directly defined by the impedance value of the sensor means, the oscillator means having an oscillation time constant determined by a plurality of impedance elements independent of the electric impedance of the sensor means, and change-over switch means for selectively connecting said independent impedance elements to the oscillator means.

2. An electric home appliance as defined in claim 1 wherein the oscillator means is an astable multivibrator.

3. An electric home appliance as defined in claim 1 wherein the gating time determining means comprises a frequency divider for dividing the frequency of a commercial a.c. power supply.

4. An electric home appliance as defined in claim 3 further characterized by manually settable register means for storing binary data corresponding to a desired state, comparison circuit means for comparing the data in the counter means with the data in the register means at intervals established by said means for determining gating time, and a power drive circuit operable by a signal from the comparison circuit means.

5. An electric home appliance as defined in claim 1 wherein the control circuit further comprises means for comparing data stored in the counter means with preset data.

6. An electric home appliance as defined in claim 5 wherein said change-over switch means is operable in response to a signal from said means for comparing data.

7. An electric home appliance as defined in claim 1 wherein said change-over switch means is operable in response to a signal from said control circuit.

8. An electric home appliance as defined in claim 1 wherein said change-over switch means is arranged to directly connect a selected independent impedance element to the oscillator in additive relation with the impedance value of the sensor means.

9. An electric home appliance as defined in claim 8 wherein said independent impedance elements are capacitors.

* * * * *